US012193572B2

(12) United States Patent
Robertson et al.

(10) Patent No.: US 12,193,572 B2
(45) Date of Patent: Jan. 14, 2025

(54) ADJUSTABLE CHAIR

(71) Applicant: EEVOLV LTD, Cheltenham (GB)

(72) Inventors: Dale Robertson, Cheltenham (GB); Paul Brown, Cheltenham (GB)

(73) Assignee: EEVOLV LTD., Cheltenham (GB)

( * ) Notice: Subject to any disclaimer, the term of this patent is extended or adjusted under 35 U.S.C. 154(b) by 280 days.

(21) Appl. No.: 17/425,235

(22) PCT Filed: Jan. 23, 2020

(86) PCT No.: PCT/GB2020/050160
§ 371 (c)(1),
(2) Date: Jul. 22, 2021

(87) PCT Pub. No.: WO2020/152472
PCT Pub. Date: Jul. 30, 2020

(65) Prior Publication Data
US 2022/0087438 A1   Mar. 24, 2022

(30) Foreign Application Priority Data

Jan. 24, 2019 (GB) .................................... 1901010

(51) Int. Cl.
*A47C 17/16* (2006.01)
*A47C 1/032* (2006.01)
(Continued)

(52) U.S. Cl.
CPC ............ *A47C 17/165* (2013.01); *A47C 1/032* (2013.01); *A47C 1/035* (2013.01); *A47C 1/124* (2013.01);
(Continued)

(58) Field of Classification Search
CPC ....... A47C 17/165; A47C 1/032; A47C 1/035; A47C 1/124; A47C 1/143; A47C 17/16;
(Continued)

(56) References Cited

U.S. PATENT DOCUMENTS

| 638,466 A | 12/1899 | Kelly |
| 1,238,078 A | 8/1917 | Ault |

(Continued)

FOREIGN PATENT DOCUMENTS

| CA | 851 402 | 9/1970 |
| CA | 831402 | 9/1970 |

(Continued)

OTHER PUBLICATIONS 3 page PDF of machine translation of DE 4030641. (Year: 1991).*

(Continued)

*Primary Examiner* — Robert Canfield
(74) *Attorney, Agent, or Firm* — Andrew F. Young; NOLTE LACKENBACH SIEGEL (57) ABSTRACT

An adjustable reclining chair having zero wall clearance has a frame and an adjustable support platform with a plurality of articulated support sections pivotally mounted with respect to one another for relative angular adjustment. An actuator means for effecting co-ordinated movement of said support sections to reconfigure the chair between a seated position and a sleeping position in which the articulated supporting sections lie in a substantially horizontal plane (H). One of the articulated support sections is a seat support inclined relative to the horizontal plane when the chair is in the seated position and substantially in the horizontal plane when the chair is in the sleeping position.

19 Claims, 7 Drawing Sheets

(51) Int. Cl.
  *A47C 1/035*  (2006.01)
  *A47C 1/124*  (2006.01)
  *A47C 1/14*  (2006.01)
  *A47C 17/165*  (2006.01)
  *A47C 17/175*  (2006.01)
  *B60N 2/34*  (2006.01)
  *B64D 11/06*  (2006.01)

(52) U.S. Cl.
  CPC ............. *A47C 1/143* (2013.01); *A47C 17/16* (2013.01); *A47C 17/163* (2013.01); *A47C 17/1753* (2013.01); *A47C 17/1756* (2013.01); *B60N 2/34* (2013.01); *B64D 11/0641* (2014.12)

(58) Field of Classification Search
  CPC .............. A47C 17/163; A47C 17/1753; A47C 17/1756; A47C 17/175; B60N 2/34; B64D 11/0641
  USPC ............ 297/118, 342, 354.13, 83, 84, 85 M; 5/17, 18.1, 23, 47
  See application file for complete search history.

(56) References Cited

U.S. PATENT DOCUMENTS

| | | | |
|---|---|---|---|
| 1,414,637 A | 5/1922 | Gell | |
| 2,209,880 A * | 7/1940 | Fox | A47C 17/1756 5/47 |
| 2,497,395 A | 2/1950 | Cramer, Sr. | |
| 2,859,797 A | 11/1958 | Mitchelson | |
| 2,954,072 A | 9/1960 | Fossati | |
| 3,086,814 A | 4/1963 | Fletcher | |
| 3,088,130 A * | 5/1963 | Walstad | A47C 17/207 5/44.1 |
| 3,107,364 A * | 10/1963 | Simmons | A47C 17/1756 5/47 |
| 3,121,589 A | 2/1964 | Schliephacke | |
| 3,202,453 A | 8/1965 | Richards | |
| 3,369,767 A | 2/1968 | Greenfield | |
| 3,600,034 A * | 8/1971 | Jones | A47C 17/22 297/15 |
| 3,847,430 A | 11/1974 | Fletcher | |
| 3,974,529 A * | 8/1976 | Johnson | A47C 17/1753 5/13 |
| 4,168,860 A * | 9/1979 | Garza | B60N 2/0292 5/47 |
| 4,204,287 A * | 5/1980 | Lane | A47C 17/22 5/13 |
| 4,204,288 A * | 5/1980 | Villa | A47C 17/1753 5/47 |
| 4,205,405 A * | 6/1980 | Hagney | A47C 17/18 5/44.1 |
| 4,212,495 A | 7/1980 | Gall | |
| 4,226,470 A * | 10/1980 | Wittmann | A47C 17/2073 297/109 |
| 4,292,697 A * | 10/1981 | Alembik | A47C 17/23 5/17 |
| 4,332,417 A | 6/1982 | Mizelle | |
| 4,635,999 A | 1/1987 | Simpson | |
| 5,083,333 A * | 1/1992 | Newton | A47C 17/1753 5/47 |
| 5,112,109 A | 5/1992 | Takada et al. | |
| 5,246,266 A | 9/1993 | Ostergaard | |
| 5,897,462 A | 4/1999 | St. Germain | |
| 6,059,364 A | 5/2000 | Dryburgh et al. | |
| 6,061,848 A | 5/2000 | Roma et al. | |
| 6,412,870 B1 * | 7/2002 | Higgins | B60N 2/995 297/354.13 |
| 6,568,755 B1 | 5/2003 | Groening | |
| 6,641,214 B2 | 11/2003 | Veneraso | |
| 6,739,651 B1 * | 5/2004 | Barefoot | A47C 17/161 297/118 |
| 6,739,661 B1 | 5/2004 | Dakes | |
| 7,318,622 B2 * | 1/2008 | Rezag | B64D 11/06 297/118 |
| 7,390,060 B2 * | 6/2008 | Kristen | A47C 1/0352 297/343 |
| 8,209,797 B2 * | 7/2012 | Swierski | A47C 17/22 5/2.1 |
| 8,424,964 B2 | 4/2013 | Campbell et al. | |
| 8,534,758 B2 | 9/2013 | Rivera | |
| 8,998,327 B2 * | 4/2015 | Cooney | B63B 29/04 297/188.1 |
| 9,591,928 B2 * | 3/2017 | Martinez | A47C 17/17 |
| 2002/0060483 A1 | 5/2002 | Yoshida et al. | |
| 2002/0162170 A1 | 11/2002 | Dewert | |
| 2006/0061148 A1 * | 3/2006 | Pollard | A47C 1/0355 297/85 M |
| 2006/0143827 A1 | 7/2006 | Wilming | |
| 2006/0225201 A1 | 10/2006 | Kristen | |
| 2007/0120409 A1 | 5/2007 | Leeds | |
| 2007/0151023 A1 * | 7/2007 | Murphy | A47C 17/17 5/13 |
| 2008/0258512 A1 | 10/2008 | Rogers | |
| 2009/0044339 A1 | 2/2009 | Morin et al. | |
| 2009/0183308 A1 | 7/2009 | Roma et al. | |
| 2012/0193946 A1 * | 8/2012 | Robertson | A47C 1/035 5/613 |
| 2014/0101846 A1 * | 4/2014 | Garland | A47C 17/86 5/55.1 |
| 2014/0103688 A1 | 4/2014 | Wilson | |
| 2014/0300161 A1 * | 10/2014 | Beroth | B64D 11/06 297/340 |
| 2016/0128883 A1 * | 5/2016 | Robertson | A47C 7/50 5/613 |
| 2016/0325838 A1 * | 11/2016 | Erhel | B60N 2/34 |
| 2017/0347797 A1 * | 12/2017 | Robertson | A47C 1/0242 |
| 2018/0041392 A1 | 2/2018 | Blair | |
| 2018/0042392 A1 * | 2/2018 | Brown | A47C 20/12 |
| 2019/0110604 A1 * | 4/2019 | Garland | A47C 17/2076 |
| 2020/0154888 A1 * | 5/2020 | Brown | A47C 20/041 |
| 2020/0154899 A1 | 5/2020 | Brown | |

FOREIGN PATENT DOCUMENTS

| | | | |
|---|---|---|---|
| CH | 597799 | 10/1975 | |
| CN | 202334169 | 7/2012 | |
| CN | 112450645 A | 3/2021 | |
| DE | 3600791 A1 * | 7/1857 | |
| DE | 3500146 A1 * | 7/1986 | |
| DE | 3738618 A1 * | 5/1989 | |
| DE | 4015919 A1 * | 12/1990 | |
| DE | 4030641 A1 * | 4/1991 | |
| DE | 029715343 | 1/1998 | |
| DE | 010162227 | 5/2003 | |
| DE | 20 2005 015 275 | 1/2006 | |
| DE | 20 2007 009 068 | 12/2007 | |
| DE | 10 2007 024 218 | 11/2008 | |
| DE | 10 2007 049 118 | 2/2009 | |
| DE | 102007049118 B3 * | 2/2009 | ............ A47C 1/036 |
| DE | 202013102322 U1 | 8/2013 | |
| EP | 0781518 | 12/1996 | |
| EP | 0865960 | 3/1998 | |
| EP | 1 537 805 | 12/2004 | |
| EP | 1 621 375 | 2/2006 | |
| EP | 2 524 623 | 11/2012 | |
| EP | 3 281 558 A1 | 8/2017 | |
| FR | 2 877 822 A1 | 11/2004 | |
| GB | 0329834 | 5/1930 | |
| GB | 0434464 | 8/1934 | |
| GB | 0775679 | 5/1957 | |
| GB | 2 085 719 | 8/1980 | |
| GB | 2227932 | 8/1990 | |
| GB | 2472920 A * | 2/2011 | ............ A47C 1/031 |
| GB | 2486335 | 6/2012 | |
| GB | 2472920 | 2/2014 | |
| GB | 191322022 | 8/2014 | |
| GB | 2520430 | 11/2015 | |
| GB | 2533216 A | 6/2016 | |
| GB | 0101239 | 8/2016 | |

(56) References Cited

FOREIGN PATENT DOCUMENTS

| | | | |
|---|---|---|---|
| JP | 36-13946 | | 5/1936 |
| JP | H01214308 | | 8/1989 |
| JP | H-11244096 A | * | 9/1999 |
| SE | 510584 C2 | * | 6/1999 |
| WO | WO 1996/029970 | | 10/1996 |
| WO | WO2004107916 | | 12/2004 |
| WO | WO 2005/051128 | | 6/2005 |
| WO | WO 2005/107533 | | 11/2005 |
| WO | WO 2006/023447 | | 3/2006 |
| WO | WO 2007/124067 | | 11/2007 |
| WO | WO 2008/129565 | | 10/2008 |
| WO | WO 2008/132481 | | 11/2008 |
| WO | WO2011/021002 | | 2/2011 |
| WO | WO2011/048384 | | 4/2011 |
| WO | WO 2012/032305 | | 3/2012 |
| WO | WO2012/099061 | | 7/2012 |
| WO | WO-2012099061 A1 | * | 7/2012 ......... A47C 1/03205 |
| WO | WO2013/061259 | | 5/2013 |
| WO | WO 2014/183112 | | 11/2014 |
| WO | WO 2011/5011432 | * | 1/2015 |
| WO | WO2017/108626 A1 | | 6/2017 |

OTHER PUBLICATIONS 4 page PDF of machine translation of DE 3600791. (Year: 1987).*
PCT/GB2020/050160, International Search Report and Written Opinion, dated Mar. 5, 2020, 14 pages—English.
GB 1901010.7. Combined Search Report and Examination Report dated Nov. 1, 2019, 9 pages—English.
Pat. No. GB1717108.6, Combined Search and Examination Report dated Mar. 26, 2015, 7 pages-English.
GB1313002.6, Search Report mailed Jan. 24, 2014, 4 pages.
PCT/GB2014/000274, Written Opinion mailed Jan. 21, 2014, 4 pages.
PCT/GB2015/000315, International Search Report and Written Opinion, mailed Jul. 3, 2016, 9 pages—English.
GB 1422032.1, Search Report dated Apr. 29, 2015, 2 pages—English.
GB1319926.0 Search Report dated May 1, 2014, 4 pages—English.
GB1419811.3 Search Report dated Dec. 17, 2014, 7 pages—English.
PCT/GB2015/000314, Search Report and Written opinion, mailed Jul. 3, 2016, 9 pages.
PCT/GB2010/001$65 International Search Report mailed Apr. 12, 2011, 6 pages—English.
U.S. Appl. No. 13/390,985, filed Feb. 17, 2012 Office Action mailed Jan. 7, 2015.
CN 202080014968.3, Office Action dated Aug. 25, 2022, 8 pages—Chinese, 10 pages—English.
PCT/GB2017/051722, Search Report and Written Opinio mailed Sep. 5, 2017, 17 pages—English.
EasyCliner & wood-to-the-floor recliner mechanism, 1 page, HomeFurnitureComponents.com Apr. 10, 2015.
PCT/GB2014/000452 Search Report and Written Opinion dated Mar. 6, 2015, 8 pages—English.
PCT/GB2023/050877, International Search Report and Written Opinion dated Aug. 31, 2023, 16 pages—English.

* cited by examiner

ADJUSTABLE CHAIR

CROSS REFERENCE TO RELATED APPLICATIONS

This application relates to and claims priority as a §371 national phase, from PCT/GB2020/050160 filed Jan. 23, 2020, the entire contents of which are incorporated herein by reference, which in turn claims priority to GB 1901010.7 filed Jan. 24, 2019.

FIGURE SELECTED FOR PUBLICATION

FIG. 1.

The present invention relates to an adjustable chair having adjustable support sections which can be moved to adjust the configuration of the chair between a seating position and a sleeping position, and in particular, to an adjustable chair which can be incorporated into a sofa assembly.

Known sofa assemblies typically comprise a generally upright back support and a fixed seat support for supporting an occupant in a seating position. More recently, sofa assemblies incorporate an inclined seat support to improve the comfort of the occupant.

There is an increasing demand for sofa assemblies with increased functionality, for example, sofa assemblies which include a chair which can be converted into a bed. One problem associated with converting a chair to a bed in known sofa assemblies is the requirement that the chair needs to exhibit zero wall functionality, that is, the chair can be positioned close to a wall and reclined without clashing with the wall.

A further problem with incorporating chairs into such sofa assemblies with inclined seat supports is that the seat section of known zero wall clearance adjustable chairs is substantially horizontal, so a gap would be created between the two seat supports.

One of the objects of the present invention is to provide an adjustable reclining chair which can be converted to a bed with improved comfort, aesthetics, and functionality, in addition to being compatible with known sofa assemblies.

Thus, according to one aspect of the present invention there is provided an adjustable reclining chair having zero wall clearance comprising a frame and an adjustable support platform having a plurality of articulated support sections pivotally mounted with respect to one another for relative angular adjustment, and actuator means for effecting co-ordinated movement of said support sections to reconfigure the chair between a seated position and a sleeping position in which the articulated supporting sections are substantially horizontal, wherein one of the plurality of articulated support sections is a seat support which is inclined relative to the horizontal when the chair is in the seated position and substantially horizontal when the chair is in the sleeping position, another of the plurality of articulated support sections is a back support pivotally mounted with respect to the seat support, wherein the back support is substantially upright when the chair is in the seated position and substantially horizontal when the chair is in the sleeping position.

Providing a chair with an inclined seat support allows the chair to be incorporated into a sofa assembly which includes a seat section which also has an inclined seat support, thereby providing a continual surface between the seat support of the chair and the seat support of the seat section of the sofa assembly without any gaps. The chair can also be converted to a bed by being adjusted between seating and sleeping positions to incorporate that functionality into a sofa assembly.

The movement of the back support follows a zero wall clearance path throughout its range of movement, that is to say a constant gap is maintained between its rearward edge and a surrounding structure, for example an adjacent wall against which either the chair alone, or the chair as part of a sofa assembly is positioned, when the back support moves rearwards or forwards with respect to the frame during adjustment of the chair.

The invention will now be described by way of example only with reference to the accompanying drawings; in which.

Figure 1:
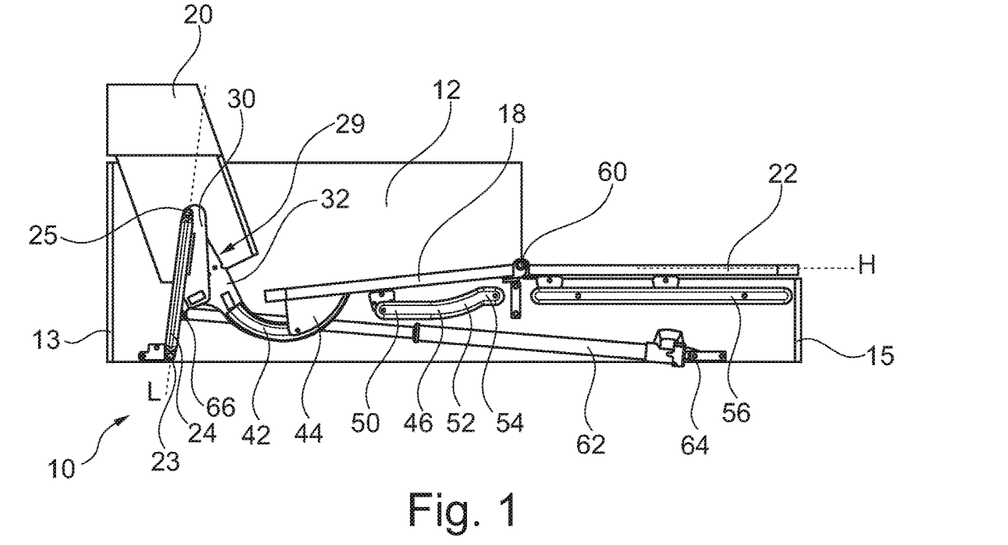
FIG. 1 is a side view of an adjustable chair according to an embodiment of the present invention, with the chair in a seating position for supporting an occupant.
Figure 2:
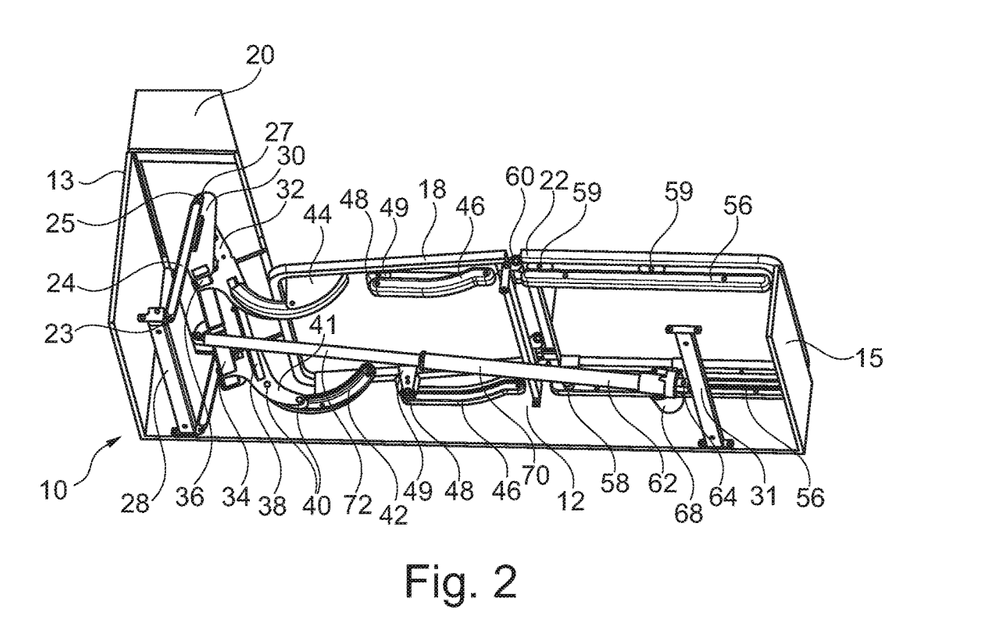
FIG. 2 is a side perspective view from underneath the adjustable chair of FIG. 1 with the chair in a seating position.
Figure 3:
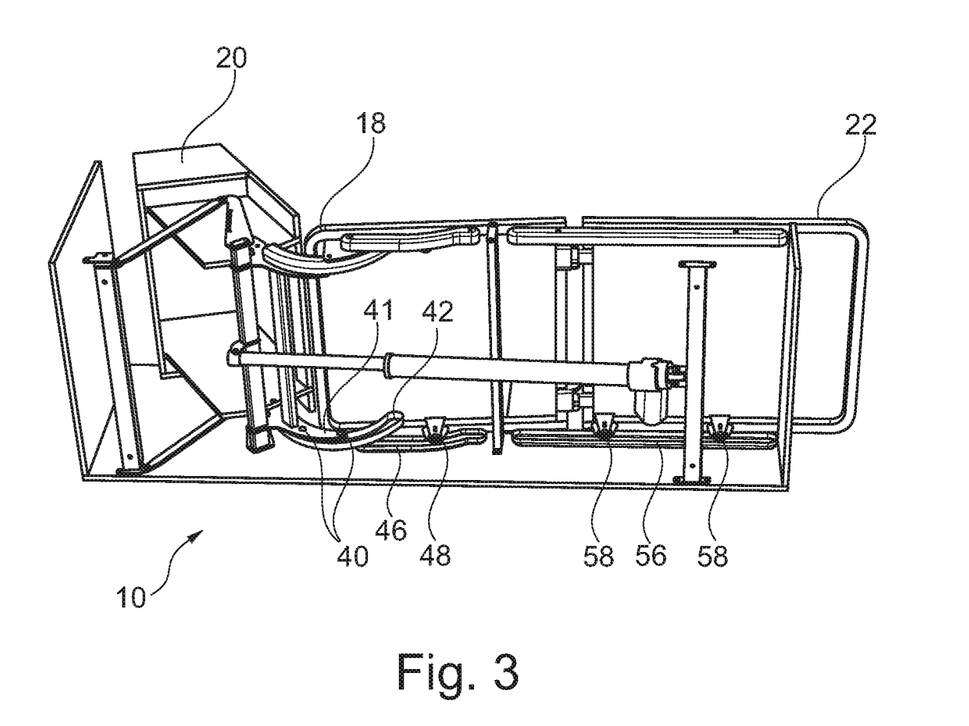
FIG. 3 is a side perspective view from underneath the adjustable chair of FIG. 1 with the chair in a seating position.

In FIGS. 1 to 3, the chair 10 comprises a support platform composed of three adjacent support sections, including an adjustable back support section 20 for supporting the upper body at the head end of the chair, an intermediate or seat support section 18, and a lower leg or foot rest support section 22 at the toe end of the chair.

The seat support 18 and foot rest support 22 are made of a generally rectangular hollow steel frame.

The back support 20 is typically constructed of wood, MDF or other suitable board material.

The seat support 18, back support 20, and foot rest support 22 are adjustably mounted on a frame in the form of a pair of lateral side panels 12. The frame further comprises a rear panel 13 and a front panel 15. The lateral side panels 12, rear panel 13, and front panel 15 are typically constructed of wood, MDF or other suitable board material.

In FIGS. 1 to 14, only one of the lateral side panels is shown to reveal the detailed construction of the adjustable chair.

The seat support 18, back support 20, and foot rest support 22 include upholstered cushions or pads (not shown) or the like for supporting an occupant (not shown) positioned on the chair.

The chair 10 further comprises a pair of connecting stays 24 and a pair of brackets 29 fixed to each side of the back support 20. The brackets 29 have a first portion 30 and a second portion 32. The connecting stay 24 has a first end 23 which is pivotally connected to opposite ends of a cross-member 28 which extends between the lateral side panels 12 at the head end of the chair, and a second end 25.

The connecting stays 24 are arranged such that a longitudinal axis L defined in the longitudinal direction of the connecting stay 24 is forwardly inclined towards the foot end of the chair, that is, the first end 23 of the stay 24 is positioned rearward of the second end 25. This inclined positioning of the connecting stay 23 prevents the stay from becoming over-centred relative to the position of an actuator acting on it, ensuring smooth movement of the connecting stay 24 as it moves the chair support sections.

A second cross-member 31 extends between the lateral side panels 12 at the foot end of the chair.

The cross-members 28,31 constitute the floor standing part of the chair 10 and in this respect the cross-members may stand directly on the floor or on legs as is well known in the art.

The second end 25 of each connecting stay 24 is pivotally connected to the first portion 30 of each respective bracket 29, with the bracket also fixed via a suitable fixing means to each side of the back support 20 to define a back support pivot point 27.

A cross-member 34 passes through an aperture 36 in the second portion 32 of each bracket and is welded to the first portion 30 of each bracket 29 at a first position (aperture 36). A further cross-member 38 is welded at each end to the second portion 32 of each bracket 29.

In the above embodiments, the cross-members are constructed of suitably dimensioned metal tube, preferably extruded steel tube.

The second portion 32 of each bracket 29 includes a curved section 41 upon which is mounted two back support cam followers in the form of roller bearings 40 (shown more clearly in FIG. 3).

The seat support 18 includes a back support cam in the form of a pair of downwardly extended curved profile guides 42 having U-section open channels with their respective open sides facing inwards into an interior region of the chair. Each of the guides 42 allows the roller bearing 40 to move when the back support 20 rotates as will be described below. Each guide 42 is fixed to the seat support 18 via a bracket 44. In an alternative embodiment the roller bearings can be provided on the seat support and the guides on the back support.

The chair 10 comprises a seat support cam in the form of a pair of guides 46 having U-section open channels which are fixed to an inward surface of the lateral side panels 12, and a seat support cam follower in the form of a single roller bearing 48 (shown more clearly in FIG. 3) which is mounted on a bracket 49 fixed to and extending downwardly from each side of the seat support 18.

Each guide 46 includes a linear horizontal first guide section 50, a second guide section 52 which is upwardly inclined relative to the first guide section 50, and a horizontal third linear guide section 54 which is substantially parallel with the first guide section 50. The first 50 and third guide sections 54 lie in substantially the same vertical plane and parallel to the surface upon which the chair sits, which is typically horizontal. The arrangement of the first 50, second 52 and third 54 guides dictates the movement of the seat support 18 as will be described below.

The chair 10 comprises a foot rest support cam in the form of a pair of horizontal linear guides 56 having U-section open channels which are fixed to an inward surface of the lateral side panels 12 and a foot rest support cam follower in the form of a pair of roller bearings 58 (shown more clearly in FIG. 3) which are each mounted on a bracket 59 and fixed to and extending downwardly in the same way as the seat support roller bearings, on each side of the foot rest support 18.

Each guide 56 comprises a U-shaped channel and is substantially horizontal and lying in the same horizontal plane as the third linear guide section 54 of the seat support guides 46. In an alternative embodiment (not shown), the foot rest support guide 56 can include a downwardly extending inclined section (second guide section) congruent with the horizontal section (first guide section) such that such that movement of the foot rest support cam follower in the first guide section causes the foot rest support to remain in a horizontal plane, and movement of the foot rest support cam follower in the second guide section causes the foot rest support to pivot downwards relative to the seat support, that is, the foot rest tilts downwards when the chair is in the seating position, but remains horizontal when in the sleeping position.

A pair of hinges 60 pivotally connects the foot rest support 22 and the seat support 18 such that the foot rest support 22 and seat support 18 can pivot relative to each other and enable forward and rearward movement of the seat support 18 under operation of the actuator to be transferred to the foot rest support 22.

Actuator means in the form of an electrical linear actuator 62 for moving the back 20, seat 18, and foot rest 22 supports relative to the lateral side panels 12 is provided underneath those supports. The actuator 62 is of the Delta-drive type produced by Dewert-Okin GmbH, and comprises a reversible motor and gearbox assembly 68, an outer tube 70 and a retractable and extendable rod 72. The actuator 62 has a first gearbox end 64 pivotally connected to a mid-point of the cross-member 31 at the foot end of the chair, and a second end 66 pivotally connected to a mid-point of the cross-member 34, both pivot connections being provided by a cross-member clevis bracket and pivot pin. The actuator 62 extends generally parallel to the lateral side panels 12 and is disposed substantially horizontal in the normal operational orientation of the chair.

Operation of the chair 10 by the actuator 62 is as follows:

In FIGS. 1 to 3, the chair 10 is shown in the seating position. In this position, the back support 20 is raised about, and inclined with respect to the side panels 12 about a pivot axis defined by the back support pivot point 27, the seat support 18 is inclined rearwards and downwards relative to a horizontal plane H, and the foot rest support 22 is substantially parallel to that horizontal plane H.

Figure 4:
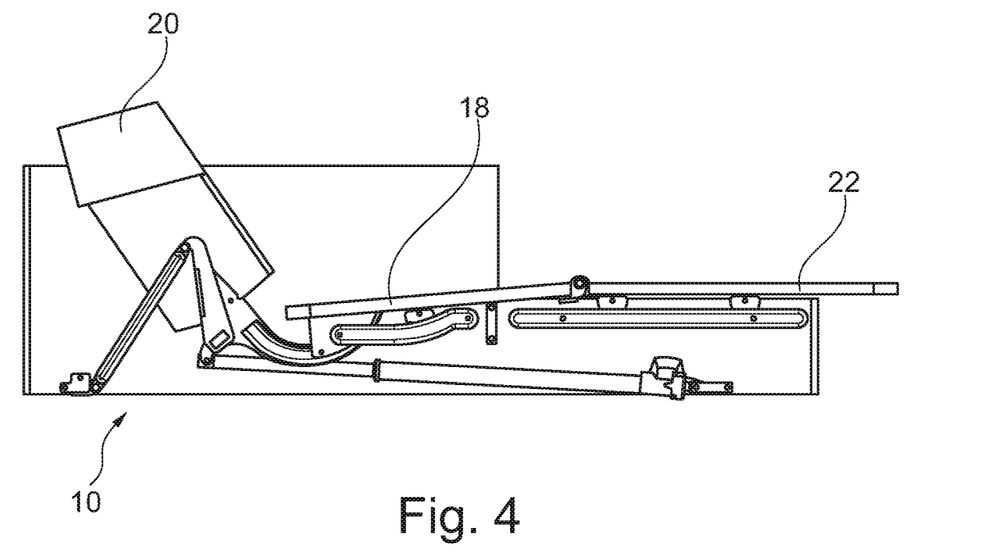
FIG. 4 is a side view of the adjustable chair of FIG. 1 with the chair in an intermediate reclined seating position.
Figure 5:
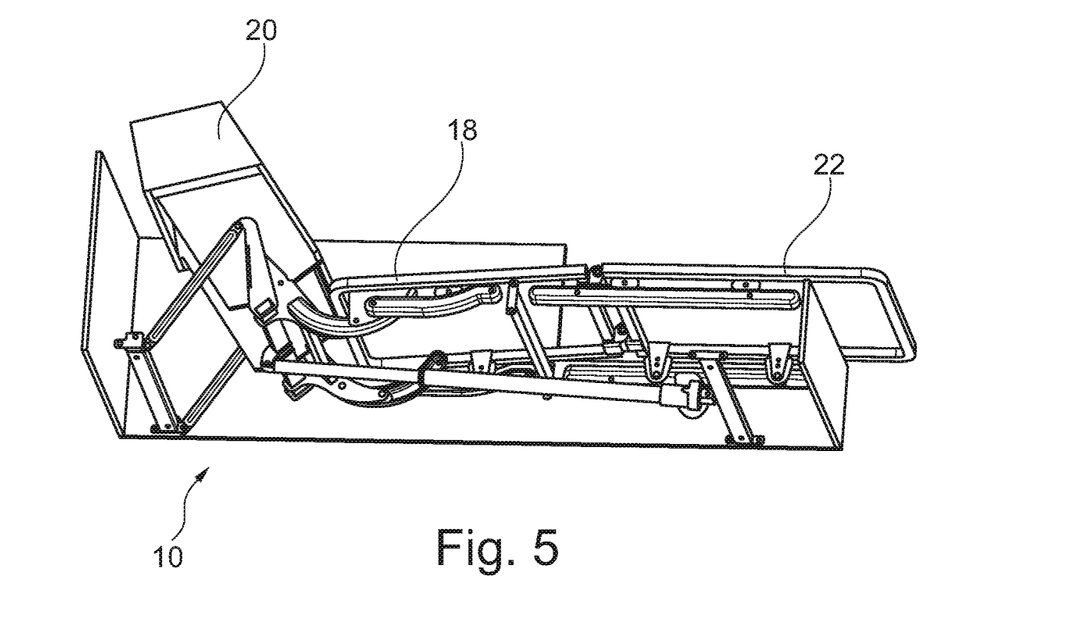
FIG. 5 is a side perspective view from underneath the adjustable chair of FIG. 1 with the chair in an intermediate reclined seating position.

In FIGS. 4 and 5, the chair 10 is shown in an intermediate position between the seating and sleeping positions. In this position, the back support 20 has pivoted anti-clockwise (when viewing the figures) to adopt a more inclined position relative to a vertical plane V (best seen by comparing FIGS. 8 and 9), causing the back support 20 and the seat support 18 and foot rest support 22 to move forwards (to the right when viewing FIGS. 5 and 6 and best seen by comparing FIGS. 8 and 9).

Figure 6:
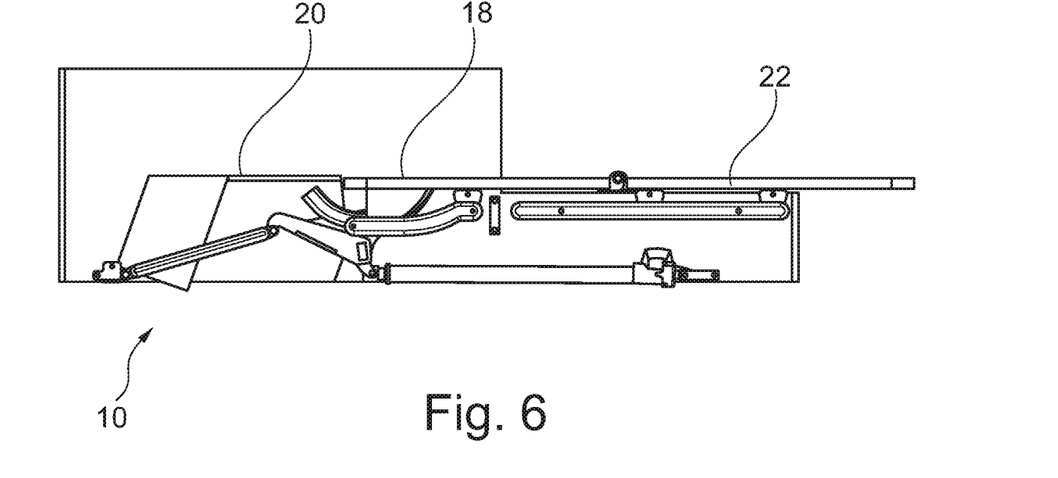
FIG. 6 is a side view of the adjustable chair of FIG. 1 with the chair in a sleeping position.
Figure 7:
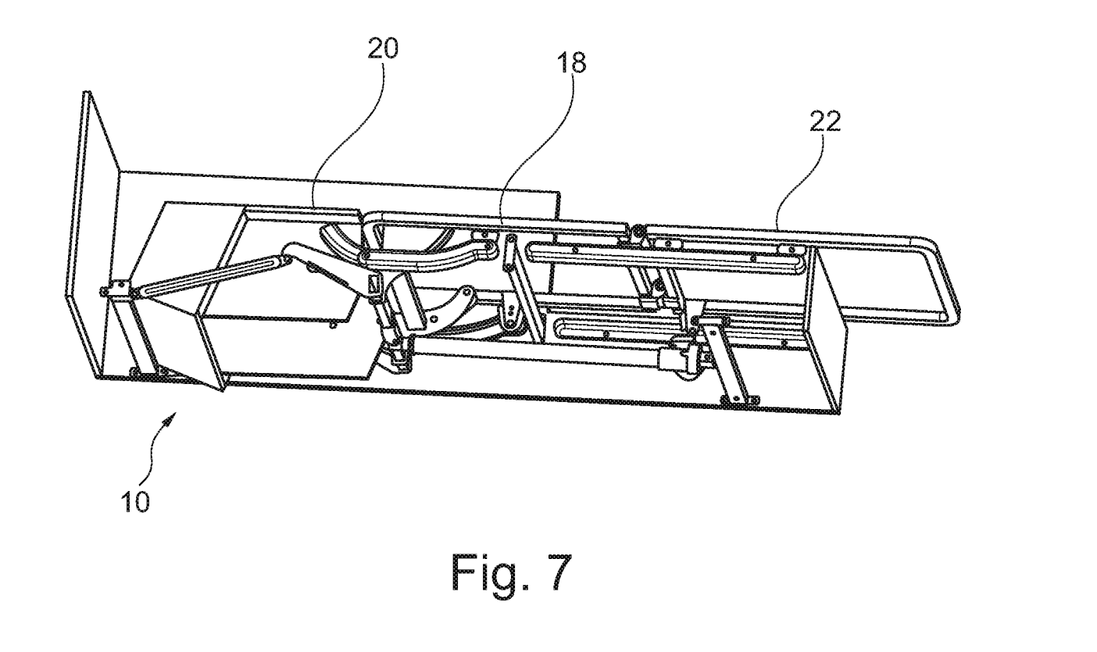
FIG. 7 is a side perspective view from underneath the adjustable chair of FIG. 1 with the chair in a sleeping position.
Figure 8:
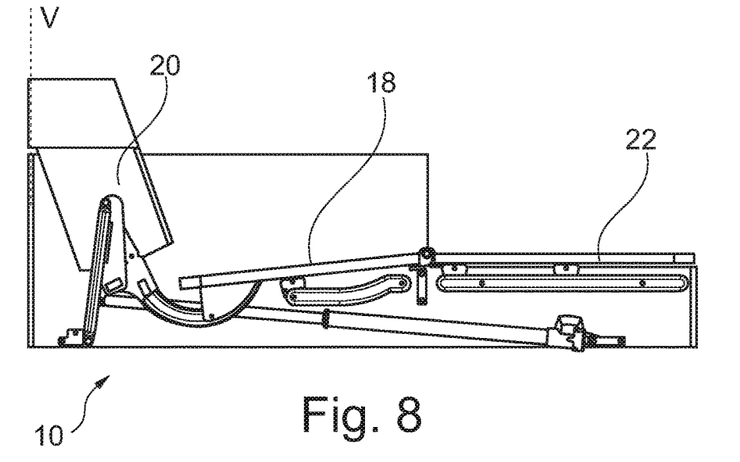
FIGS. 8 to 10 are respective side views of the adjustable chair of FIG. 1 in the seating, intermediate and sleeping position.
Figure 9:
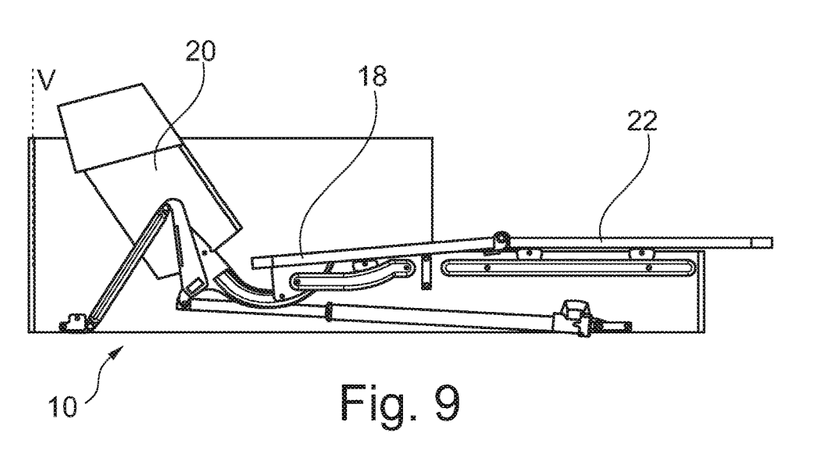
Figure 10:
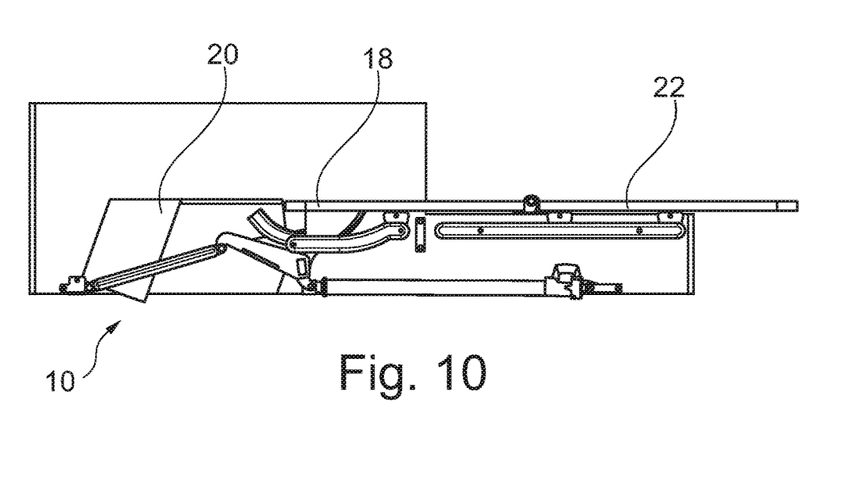
Figure 11:
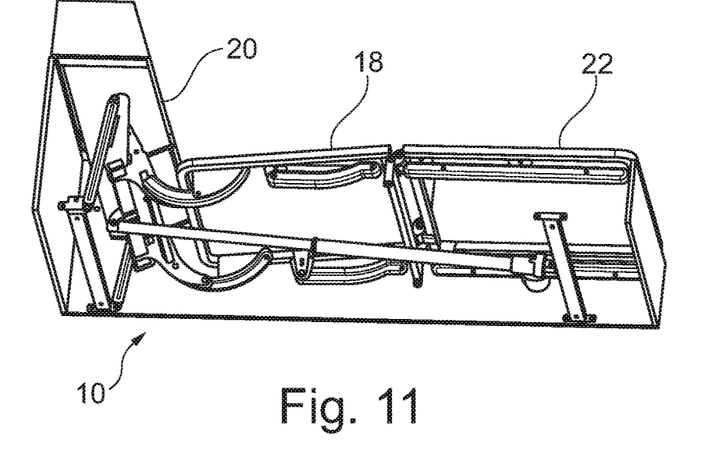
FIGS. 11 to 13 are respective perspective side views from underneath the adjustable chair of FIG. 1 in the seating, intermediate and sleeping position.
Figure 12:
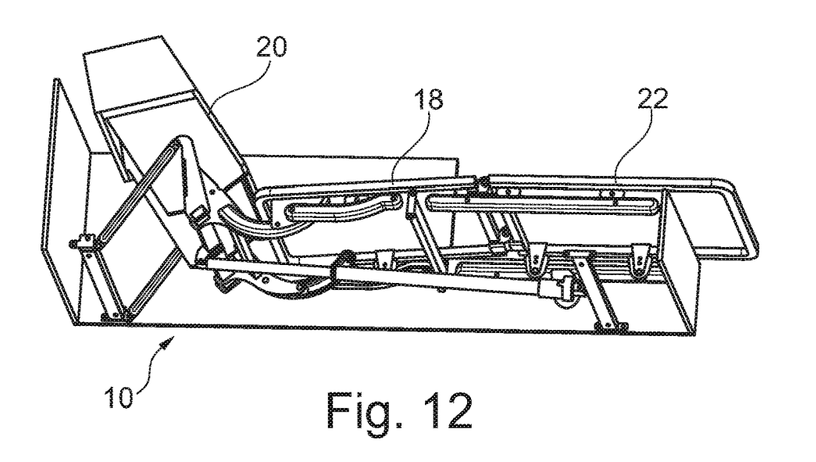
Figure 13:
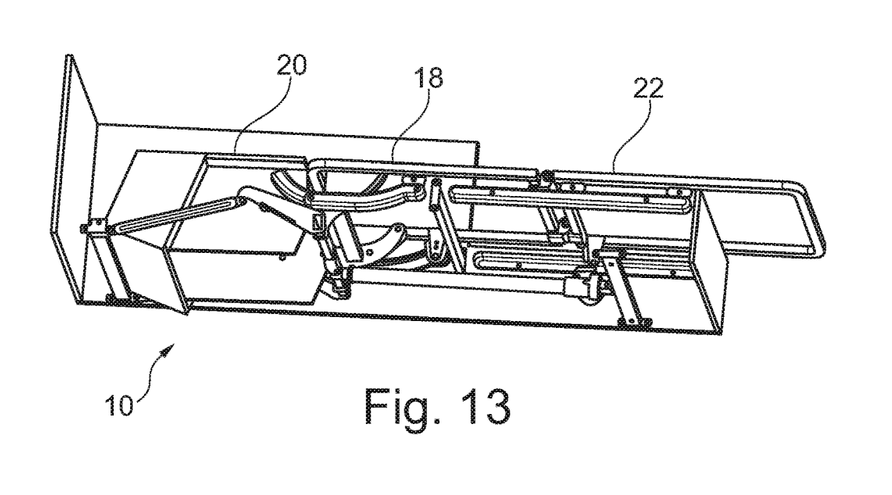
Figure 14:
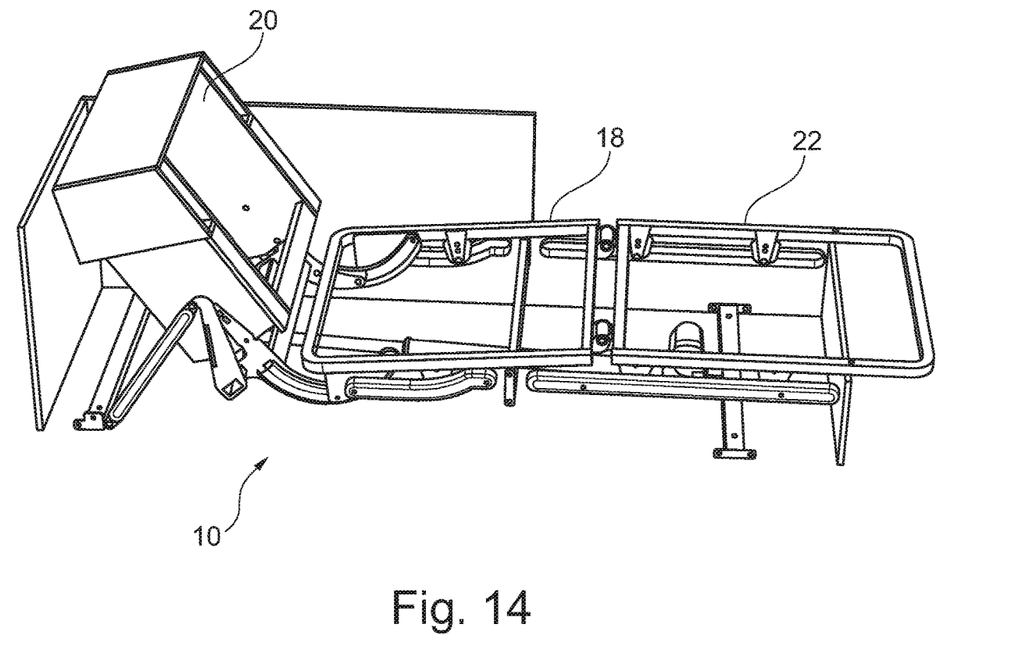
FIG. 14 is a side perspective view from underneath the adjustable chair of FIG. 1 with the chair in an intermediate reclined seating position.

In FIGS. 6 and 7, the chair 10 is shown in the sleeping position, in this position, the back support 20 has further pivoted anti-clockwise to adopt a flat horizontal position, causing the back support 20 and the seat support 18 and foot rest support 22 to move further forwards, and the seat support 18 to adopt a flat horizontal position horizontally aligned with the back support 20 and the foot rest support 18.

Starting from the seating position (FIGS. 1 to 3), operation of the actuator 62 causes the extendable rod 72 to retract into the outer tube 70 and cause rotation of the cross-member 34. As cross-member 34 rotates, brackets 29 which are fixed to the back support 20, also rotate due to the actuator means being pivotally connected to the first position (aperture 36) of the bracket 29, and the second end 25 of the connecting stay 24 being pivotally connected to a second position of the bracket 29 at pivot point 27 which is spaced from the first position 36. The spacing of the first position 36 and the pivot point 27 causes the bracket 29 to rotate when the actuator means 62 moves, resulting in the roller bearings 40 sliding within the guides 42. At the same time, the connecting stay 24 pivots clockwise about a pivot point defined by first end 23 which is fixed to the lateral side panels 20. The combination of the pivoting connecting stay 24 and movement of the roller bearings 40 within the guides 42 causes the back support 20 to move forwards and downwards as it rotates anticlockwise, which in turn causes the seat support 18 and foot rest support 22 to move forwards towards the sleeping position of FIGS. 6 and 7.

As the seat support 18 moves forward, the first 50, second 52, and third 54 guide sections of the seat support cam guides 46 dictate the position of the seat support 18. As the rollers 48 move from the first guide section 50 to the inclined second guide section 52, that is towards the intermediate position of FIGS. 4 and 5, the seat support 18 rotates upwards about hinge 60 to remain in an inclined position, but at a shallower incline when compared to the seating position of FIGS. 1 to 3. As the rollers 48 move from the inclined second guide section 52 to the third guide section 54, that is towards the sleeping position of FIGS. 6 and 7, the seat support 18 moves to the horizontal position.

At the same time as the seat support 18 moves as described above, the foot rest support 22 also moves forward by virtue of being connected by hinge 60. The foot rest support 22 remains in a horizontal position by virtue of the provision of the two roller bearings 58 moving in the guides 56.

At the same time as the seat support 18 and foot rest support 22 move as described above, the back support 20 rotates towards a horizontal position as it moves forwards and downwards as the actuator 62 retracts.

It can be seen in FIGS. 6 and 7 that in the sleeping position, the back support 20, seat support 18, and the foot rest support 22 are all substantially horizontal and aligned in a common plane to provide a substantially flat planar horizontal support platform suitable for sleeping.

FIGS. 8 to 10 and 11 to 13 show a comparison between the seating, intermediate and sleeping position showing the relative positions of the back support 20, seat support 18, and the foot rest support 22.

It will be understood that reversing the directing of the actuator 62 moves the chair from the sleeping position to the seating position.

The adjustable reclining chair described above can advantageously be incorporated into a sofa assembly (not shown) which comprises a first chair with a back support section and an inclined seat section, the reclining chair (second chair) being positioned adjacent the first chair to form a two seater (or two chair) sofa assembly. By virtue of the chair of the present invention having an inclined seat support, the chair can be incorporated into the sofa assembly which includes the first chair with a first seat section which also has an inclined seat support, thereby providing a continual seating surface without any gaps. The adjustable reclining chair of the present invention can then be converted to a bed by being adjusted between seating and sleeping positions to incorporate that functionality into a sofa assembly. It will be understood that the sofa assembly need not be limited to two seats.

The movement of the back support follows a zero wall clearance path throughout its range of movement, that is to say a constant gap is maintained between its rearward edge and a surrounding structure, for example an adjacent wall against which either the chair alone, or the chair as part of a sofa assembly is positioned, when the back support moves rearwards or forwards with respect to the frame during adjustment of the chair.

The invention claimed is:

1. An adjustable reclining chair (10), having a zero wall clearance, comprising:
   a frame (12) and an adjustable support platform having a plurality of articulated support sections (20,18,22) pivotally mounted with respect to one another for relative angular adjustment, and actuator means (62) for effecting co-ordinated movement of said support sections to reconfigure the adjustable reclining chair (10) between a seated position and a sleeping position in which the articulated supporting sections lie in a substantially horizontal plane (H);
   wherein one of the plurality of articulated support sections is a seat support (18) which is inclined relative to the horizontal plane when the adjustable reclining chair is in the seated position and substantially in the horizontal plane when the adjustable reclining chair is in the sleeping position;
   another of the plurality of articulated support sections is a back support (20) pivotally mounted with respect to the seat support (18);
   wherein the back support (20) is substantially upright when the adjustable reclining chair (10) is in the seated position and substantially horizontal when the adjustable reclining chair is in the sleeping position;
   a back support cam (42) on one of the back (20) or the seat supports (18);
   a back support cam follower (40) on the other of the back (20) or the seat supports (18); and
   the back support cam (42) arranged such that the back support (20) moves forwards and downwards relative to the frame as the actuator means (62) moves the adjustable reclining chair (10) from the seated position towards the sleeping position.

2. The adjustable reclining chair, according to claim 1, wherein:
   the back support cam (42) has a downwardly extending curved profile (41).

3. The adjustable reclining chair, according to claim 1, further comprising:
   a connecting stay (24) having a first end (23) pivotally connected to the frame and a second end (25) pivotally connected to the back support at a back support pivot point (27).

4. The adjustable reclining chair, according to claim 3, wherein:
   the second end (25) of the connecting stay (24) is positioned forward of the first end (23) such that the connecting stay (24) is forwardly inclined to the vertical (V) in both the seated and sleeping positions.

5. The adjustable reclining chair, according to claim 3, wherein:
   the back support pivot point (27) is positioned rearwards of an imaginary pivot point about which the back support cam follower (40) moves in the back support cam (42), such that the back support (20) moves forwards relative to the frame as the actuator means (62) moves the adjustable reclining chair from the seated position towards the sleeping position.

6. The adjustable reclining chair, according to claim 5, wherein:
the actuator means (62) has a first end (64) and a second end (66), in which the first end (64) is connected to the frame and the second end (66) is connected to the back support (20).

7. The adjustable reclining chair, according to claim 6, wherein:
the second end (66) of the actuator means (62) is connected to the back support (20) at a position which is spaced from the back support pivot point (27) such that movement of the actuator means (62) causes the back support to rotate about the back support pivot point (27).

8. The adjustable reclining chair, according to claim 7, further comprising:
a bracket (29) which is fixed to the back support, in which the second end (66) of the actuator means is pivotally connected to a first position (36) of the bracket (29); and
the second end (25) of the connecting stay (24) is pivotally connected to a second position of the bracket (29) which is spaced from the first position such that movement of the actuator means (62) causes the bracket (29) to rotate.

9. The adjustable reclining chair, according to claim 8, wherein:
one of the back support cam (42) or the cam follower (40) is provided on the bracket (29), and
the other of the back support cam (42) or the cam follower (40) is provided on the seat support (18).

10. The adjustable reclining chair, according 7, further comprising:
a seat support cam (46) is associated with one of the seat support (18) or the frame and a seat support cam follower (48) is associated with the other of the seat support (18) or the frame; and
the seat support cam (46) is arranged such that the seat support (18) moves forwards and rotates upwards relative to the frame as the actuator means (62) moves the adjustable reclining chair (10) from the seated position towards the sleeping position.

11. The adjustable reclining chair, according claim 10, wherein:
the plurality of articulated support sections, further comprises:
a foot rest support (22) pivotally mounted with respect to the seat support (18); and
the adjustable chair further comprises a foot rest support cam (56) associated with one of the foot rest support (22) or the frame;
a foot rest support cam follower (58) is associated with the other of the foot rest support (22) or the frame; and
the foot rest support cam (56) is arranged such that the foot rest support (18) moves forwards relative to the frame as the actuator means (62) moves the adjustable reclining chair from the seated position towards the sleeping position.

12. The adjustable reclining chair, according to claim 10, wherein:
the seat support cam (46) further comprises:
a first guide section (50) and a second guide section (52);
wherein at least part of the second guide section (52) is upwardly inclined relative to the first guide section (50) such that movement of the seat support cam follower (48) in the second guide section (52) causes the seat support (18) to pivot relative to a foot rest support (22).

13. The adjustable reclining chair, according to claim 12, wherein:
the seat support cam (46) further comprises:
a third guide section (54) which is substantially parallel to the first guide section (50) such that movement of the seat support cam follower (48) in the third guide section (50) causes the seat support (18) to align in a common horizontal plane with the foot rest support (22).

14. The adjustable reclining chair, according to claim 10, wherein:
the foot rest support cam (56) further comprises:
a substantially horizontal first guide section configured such that movement of the foot rest support cam follower (58) in the first guide section causes the foot rest support (22) to remain in a horizontal plane.

15. The adjustable reclining chair, according to claim 10, wherein:
the foot rest support cam further comprises:
a substantially horizontal first guide section and a second guide section which is downwardly inclined relative to the first guide section such that movement of the foot rest support cam follower in the first guide section causes the foot rest support to remain in a horizontal plane, and movement of the foot rest support cam follower in the second guide section causes the foot rest support to pivot downwards relative to the seat support.

16. The adjustable reclining chair, according to claim 15, wherein:
the frame includes a pair of lateral side panels (12).

17. The adjustable reclining chair, according to claim 16, further comprising:
a cross-member (28) connecting and fixed to the lateral side panels (12), in which the first end (23) of the connecting stay (24) is pivotally connected to the cross-member (28).

18. The adjustable reclining chair, according to claim 17, wherein:
a foot rest support (22) is pivotally connected to the seat support (18) via a hinge (60).

19. A sofa assembly, comprising:
a first chair with a back support section and an inclined, fixed, seat section; and
a second chair positioned adjacent the first chair, in which the second chair is an adjustable chair (10) according to claim 1.

* * * * *